United States Patent
Stilgenbauer et al.

(10) Patent No.: US 9,856,785 B2
(45) Date of Patent: Jan. 2, 2018

(54) EXHAUST-GAS TURBOCHARGER

(71) Applicant: BorgWarner Inc., Auburn Hills, MI (US)

(72) Inventors: Michael Stilgenbauer, Bolanden (DE); Mathias Weber, Kirchheim (DE); Rolf Sauerstein, Finkenbach-Gersweiler (DE)

(73) Assignee: BorgWarner Inc., Auburn Hills, MI (US)

( * ) Notice: Subject to any disclaimer, the term of this patent is extended or adjusted under 35 U.S.C. 154(b) by 336 days.

(21) Appl. No.: 14/648,024

(22) PCT Filed: Nov. 21, 2013

(86) PCT No.: PCT/US2013/071131
§ 371 (c)(1),
(2) Date: May 28, 2015

(87) PCT Pub. No.: WO2014/088818
PCT Pub. Date: Jun. 12, 2014

(65) Prior Publication Data
US 2015/0300244 A1 Oct. 22, 2015

(30) Foreign Application Priority Data
Dec. 5, 2012 (DE) .................. 10 2012 023 805

(51) Int. Cl.
F01D 17/00 (2006.01)
F02B 37/18 (2006.01)
F01D 17/10 (2006.01)
F02C 6/12 (2006.01)

(52) U.S. Cl.
CPC .......... *F02B 37/186* (2013.01); *F01D 17/105* (2013.01); *F02B 37/183* (2013.01); *F02C 6/12* (2013.01); *Y02T 10/144* (2013.01)

(58) Field of Classification Search
CPC ........................................................ F02B 37/186
See application file for complete search history.

(56) References Cited

U.S. PATENT DOCUMENTS

| | | | |
|---|---|---|---|
| 4,794,758 A * | 1/1989 | Nakazawa | F01D 17/18 60/602 |
| 5,046,317 A | 9/1991 | Satokawa | |
| 5,996,348 A | 12/1999 | Watkins | |
| 2006/0289072 A1 * | 12/2006 | McMullen | F01D 17/105 137/601.01 |
| 2009/0151352 A1 | 6/2009 | McEwan et al. | |
| 2012/0060494 A1 | 3/2012 | Sato et al. | |
| 2012/0060495 A1 | 3/2012 | Jacob | |

OTHER PUBLICATIONS

International Search Report in International Application No. PCT/US2013/071131, dated Feb. 27, 2014.

* cited by examiner

*Primary Examiner* — Logan Kraft
*Assistant Examiner* — Jason Fountain
(74) *Attorney, Agent, or Firm* — Eric L. Doyle; Stephan A. Pendorf; Patent Central LLC

(57) ABSTRACT

An exhaust-gas turbocharger (1) having a compressor (2) which has a compressor housing (3); having a turbine (4) which has a turbine housing (5); and having a charge-pressure regulating device (6). The charge-pressure regulating device (6) has at least two flap arrangements (7, 8) and two bypass duct openings (9, 10) assigned to the flap arrangements (7, 8).

11 Claims, 3 Drawing Sheets

EXHAUST-GAS TURBOCHARGER

BACKGROUND OF THE INVENTION

Field of the Invention

The invention relates to an exhaust-gas turbocharger.

Description of the Related Art

In a generic exhaust-gas turbocharger, charge-pressure regulation is realized by means of a charge-pressure regulating device which has a compressor-side and/or turbine-side bypass that can be opened or closed by means of an actuator-operated flap plate. Said type of charge-pressure regulation can be used for single-stage, two-stage or twin-scroll turbocharger arrangements, or also in the case of turbochargers with a variable turbine geometry and wastegate.

Here, the charge-pressure regulation is realized in that a fraction of the exhaust gas is conducted so as to bypass the turbine by virtue of the flap plate being opened. In the case of two-stage regulation, one of the two turbochargers connected in parallel is regulated by means of a regulating flap.

A technical problem in the case of a single flap is however the leakage and the poor regulability, that is to say at a small stroke, a relatively large mass flow bypasses the turbine. At small strokes, however, small changes in the flap plate position result in relatively large changes in the bypass mass flow. If relatively small bore diameters were used for the bypass or the bypass opening, said problem would duly be alleviated, but this would result in the maximum possible bypass mass flow being reduced, such that, both at engine full load and also at engine part load, it would not be possible for the charge pressure to be regulated down, that is to say reduced, to an adequate extent.

BRIEF SUMMARY OF THE INVENTION

It is therefore an object of the present invention to specify an exhaust-gas turbocharger capable of solving the above-mentioned technical problems of the prior art.

The solution according to the invention is based on the concept of providing not a single bypass opening or bore but two or multiple bores of said type, wherein each of said bores has a separate regulable flap plate assigned thereto.

Said concept may be used both on the turbine side and also on the compressor side.

It is thus made possible, with for example a given change in the stroke, to realize finer regulation of the exhaust-gas mass flow to be diverted. Furthermore, it is possible, when the two flap plates are open, to realize large opening cross sections which make it possible to realize high bypass rates.

The dependent claims contain advantageous developments of the invention.

It is thus possible for the bypass bores to be of equal diameter, or for bores of different diameter to be provided.

The actuation of the flap plates may be realized by means of suitable actuation elements (actuators), such as for example electric actuators or pneumatic control capsules.

It is also possible for the flap plates to be actuated simultaneously or with a time offset.

It is finally possible for the flap to be provided with a crank drive or to be formed as a charge-pressure valve.

BRIEF DESCRIPTION OF THE SEVERAL VIEWS OF THE DRAWINGS

Further details, advantages and features of the present invention will emerge from the following description of exemplary embodiments with reference to the drawing, in which.

DETAILED DESCRIPTION OF THE INVENTION

Figure 1:
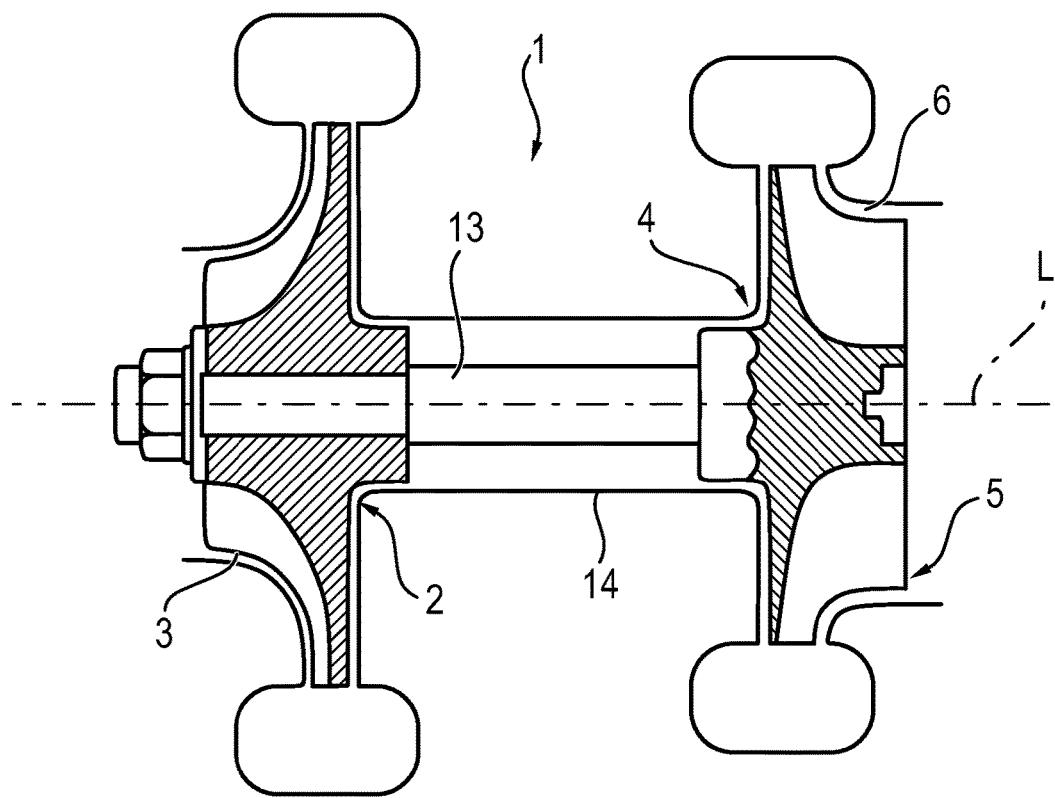
FIG. 1 shows a schematically greatly simplified diagrammatic illustration of an exhaust-gas turbocharger according to the invention.

FIG. 1 illustrates an exhaust-gas turbocharger 1 in a schematically highly simplified diagrammatic illustration. As is conventional, said exhaust-gas turbocharger 1 has a compressor 2 with a compressor housing 3 and has a turbine 4 with a turbine housing 5. The compressor housing 3 and the turbine housing 5 are connected to one another via a bearing housing 14 in which a shaft 13 that has the turbine wheel and the compressor wheel is mounted.

In the illustrated embodiment of the exhaust-gas turbocharger 1, the turbine housing 5 is provided with a charge-pressure regulating device 6 according to the invention, which charge-pressure regulating device is merely symbolically indicated in FIG. 1 and will be described in detail below on the basis of FIGS. 2 and 3.

Figure 2:
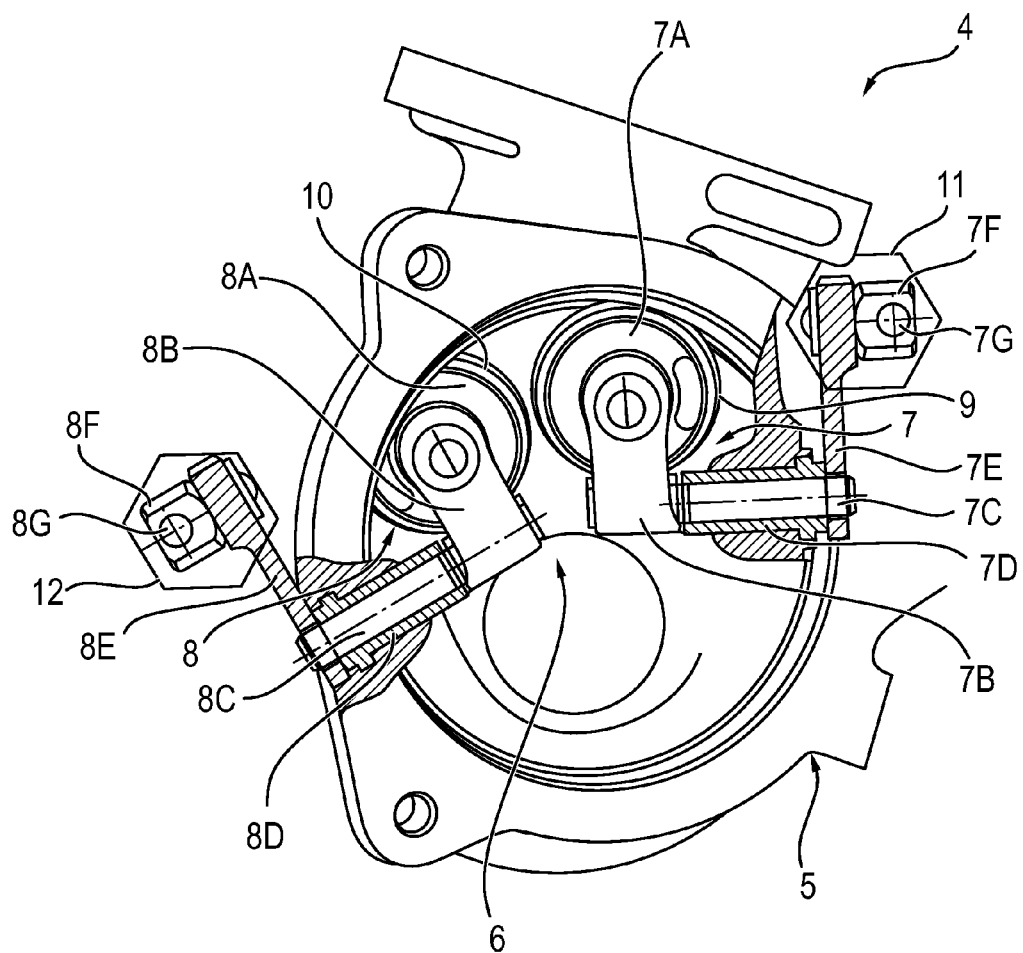
FIG. 2 shows an illustration of a turbine housing for explanation of the construction of a first embodiment of the charge-pressure regulating device according to the invention.
Figure 3:
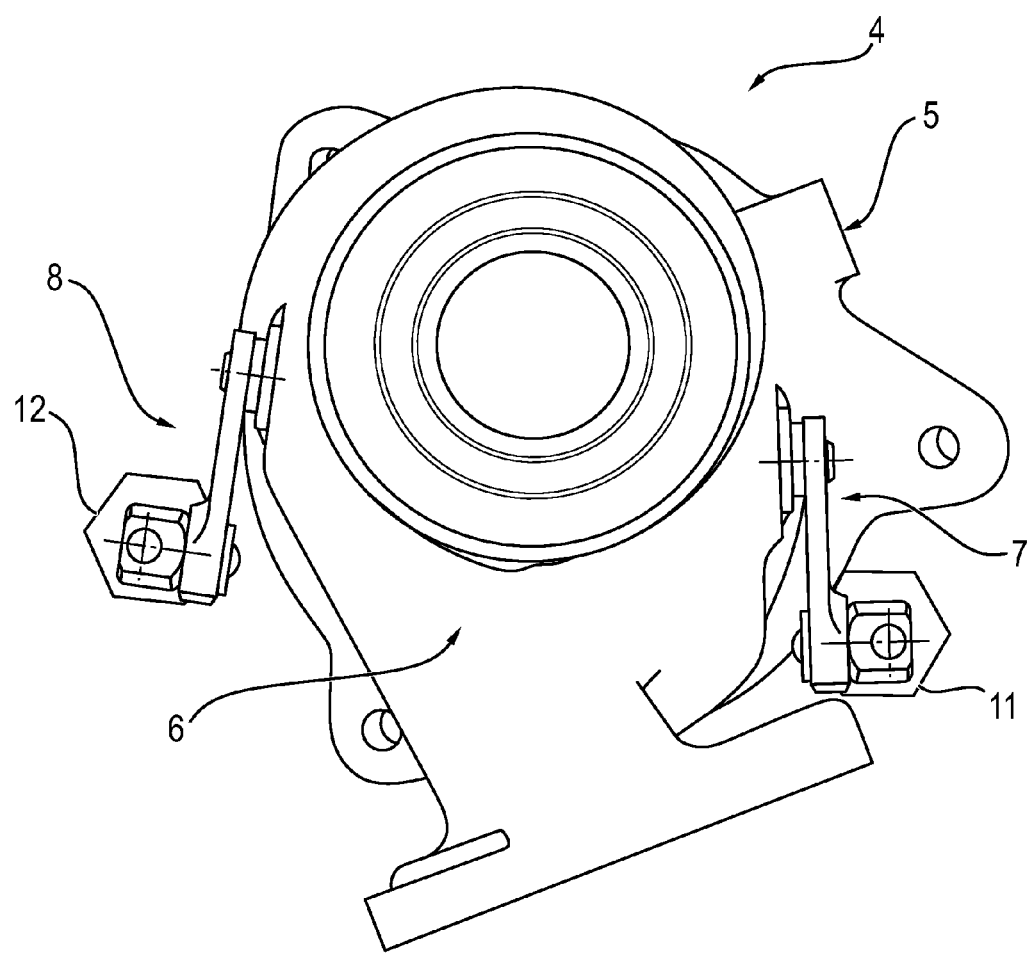
FIG. 3 shows an illustration of the same charge-pressure regulating device (viewed from the bearing housing side).

FIGS. 2 and 3 show an embodiment of said charge-pressure regulating device 6, which is arranged in the housing 5 of the turbine 4.

In the embodiment illustrated in FIGS. 2 and 3, the charge-pressure regulating device 6 has two flap arrangements 7 and 8 which are positioned adjacent to one another and which have in each case one flap plate 7A and 8A respectively, by means of which flap plate a respective associated bypass opening 9 and 10 is closed (as illustrated in FIGS. 2 and 3) and, if an exhaust-gas mass flow is to be conducted so as to bypass the turbine wheel of the turbine 4, opened.

This illustration with two flap arrangements 7 and 8 is however to be understood merely as an example. It would theoretically likewise be possible for more than two such flap arrangements to be provided in order to attain the advantages explained in the introduction.

In the embodiment illustrated here, the flap arrangements 7 and 8 are provided in each case with a crank drive which comprises a respective inner flap lever 7B and 8B connected to the flap plate 7A, 8A. The flap lever 7B, 8B is connected to a respective spindle 7C and 8C which is mounted in the housing 5 by means of a respective bushing 7D and 8D. The spindle 7C and 8C is connected to a respective outer lever 7E and 8E which is connected via a respective connecting piece 7F and 8F to a respective regulating rod 7G and 8G of a respective associated actuator 11 and 12, wherein the actuators 11 and 12 are in each case indicated symbolically by the two hexagons.

In addition to the above written description of the invention, reference is hereby explicitly made, for additional disclosure thereof, to the diagrammatic illustration in FIGS. 1 to 3.

LIST OF REFERENCE SIGNS

1 Exhaust-gas turbocharger
2 Compressor
3 Compressor housing
4 Turbine
5 Turbine housing
6 Charge-pressure regulating device
7, 8 Flap arrangement
7A, 8A Flap plate
7B, 8B Inner flap lever
7C, 8C Spindle
7D, 8D Bushing
7E, 8E Outer lever
7F, 8F Connecting piece
7G, 8G Regulating rod
9, 10 Bypass openings
11, 12 Actuators
13 Shaft
14 Bearing housing
L Longitudinal axis of the exhaust-gas turbocharger 1

The invention claimed is:

1. An exhaust-gas turbocharger (1) with
a compressor (2) which has a compressor housing (3);
a turbine (4) which has a turbine housing (5); and
a charge-pressure regulating device (6),
wherein
the charge-pressure regulating device (6) has at least first and second flap arrangements (7, 8), first and second bypass duct openings (9, 10), and first and second actuators (11, 12), wherein the first actuator (11) controls the first flap arrangement (7) associated with the first bypass duct opening (9) and the second actuator (12) controls the second flap arrangement (8) associated with the second bypass duct opening (10).

2. The exhaust-gas turbocharger as claimed in claim 1, wherein the bypass duct openings (9, 10) are of equal diameter.

3. The exhaust-gas turbocharger as claimed in claim 1, wherein the bypass duct openings (9, 10) are of different diameter.

4. The exhaust-gas turbocharger as claimed in claim 1, wherein the charge-pressure regulating device (6) is installed in the turbine housing (5) and/or compressor housing (3).

5. The exhaust-gas turbocharger as claimed in claim 1, wherein the charge-pressure regulating device (6) is actuated by an electric actuator.

6. The exhaust-gas turbocharger as claimed in claim 1, wherein the charge-pressure regulating device (6) is actuated by a pneumatic control capsule.

7. The exhaust-gas turbocharger as claimed in claim 1, wherein the flap arrangements (7, 8) can be actuated simultaneously.

8. The exhaust-gas turbocharger as claimed in claim 1, wherein the flap arrangements (7, 8) can be actuated with a time offset.

9. The exhaust-gas turbocharger as claimed in claim 1, wherein the flap arrangements (7, 8) have a crank drive (7C to 7G; 8B to 8G).

10. The exhaust-gas turbocharger as claimed in claim 1, wherein the flap arrangements (7, 8) are charge-pressure valves.

11. An exhaust-gas turbocharger (1) with
a compressor (2) which has a compressor housing (3);
a turbine (4) which has a turbine housing (5); and
a charge-pressure regulating device (6),
wherein
the charge-pressure regulating device (6) has at least first and second flap arrangements (7, 8) and first and second bypass duct openings (9, 10) assigned to the flap arrangements (7, 8),
wherein each flap arrangement includes a crank drive comprising an inner flap lever (7B, 8B) connected to a flap plate (7A, 8A), a spindle (7C, 8C) having a spindle inner end and a spindle outer end, the spindle inner end connected to the inner flap lever (7B, 8B) and the spindle outer end connected to an outer lever (7E, 8E), and first and second actuators (11, 12), wherein the first actuator (11) is connected to the outer lever (7E) of the first flap arrangement (7) and the second actuator (12) is connected to the outer lever (8E) of the second flap arrangement (8).

* * * * *